United States Patent [19]
Webb

[11] Patent Number: 5,519,942
[45] Date of Patent: May 28, 1996

[54] LEVELLING AND TRANSIT SYSTEM

[76] Inventor: James Webb, 877 Avenue B, Redondo Beach, Calif. 90277

[21] Appl. No.: 397,588

[22] Filed: Mar. 2, 1995

[51] Int. Cl.[6] .............................. G01C 9/00; G01C 5/00
[52] U.S. Cl. ............................ 33/290; 33/281; 33/451; 33/DIG. 21
[58] Field of Search ........................... 33/290, 281, 282, 33/283, 285, 291, 340, 341, 370, 371, 407, 451, DIG. 21, 375, 384, 387, 388; 356/138, 399

[56] References Cited

U.S. PATENT DOCUMENTS

| | | | |
|---|---|---|---|
| 662,991 | 12/1900 | Van Luvan | 33/375 |
| 739,242 | 9/1903 | Weber | 33/290 |
| 2,570,430 | 10/1951 | Cramer | 33/375 |
| 3,225,451 | 12/1965 | Olexson et al. | 33/384 |
| 3,897,637 | 8/1975 | Genho | 33/290 |
| 4,912,851 | 4/1990 | Rando et al. | 33/DIG. 21 |
| 5,394,616 | 3/1995 | Claxton | 33/DIG. 21 |
| 5,442,864 | 8/1995 | Erman | 33/370 |

FOREIGN PATENT DOCUMENTS

| | | | |
|---|---|---|---|
| 298323 | 10/1928 | United Kingdom | 33/451 |
| 92/20998 | 11/1992 | WIPO | 33/451 |

*Primary Examiner*—Christopher W. Fulton
*Attorney, Agent, or Firm*—Roger A. Marrs

[57] ABSTRACT

A device for performing levelling and transit functions is disclosed herein having an elongated member with parallel spaced-apart top and bottom flat surfaces separated by a thickened web. The web includes several cutouts exposing bubble indicators arranged in a variety of orientations and includes a rotary module at one end movably mounting a laser beam generator. The module has a passageway conducting a laser beam to a selected one of several slots or passageways provided in the end of the member in response to manual rotation of the module by the user whereby the beam exits the device in a linear path. The web includes a housing adjacent to the module enclosing electrical circuits, battery power supply and button controls for operation of the laser. A pivoting panel is coextensive with the top flat surface in a stored position while pivotal to a position normal to the top flat surface when used as a corner square. A thumb adjustment screw protrudes from the web through a flat surface to angle the device if desired.

11 Claims, 2 Drawing Sheets

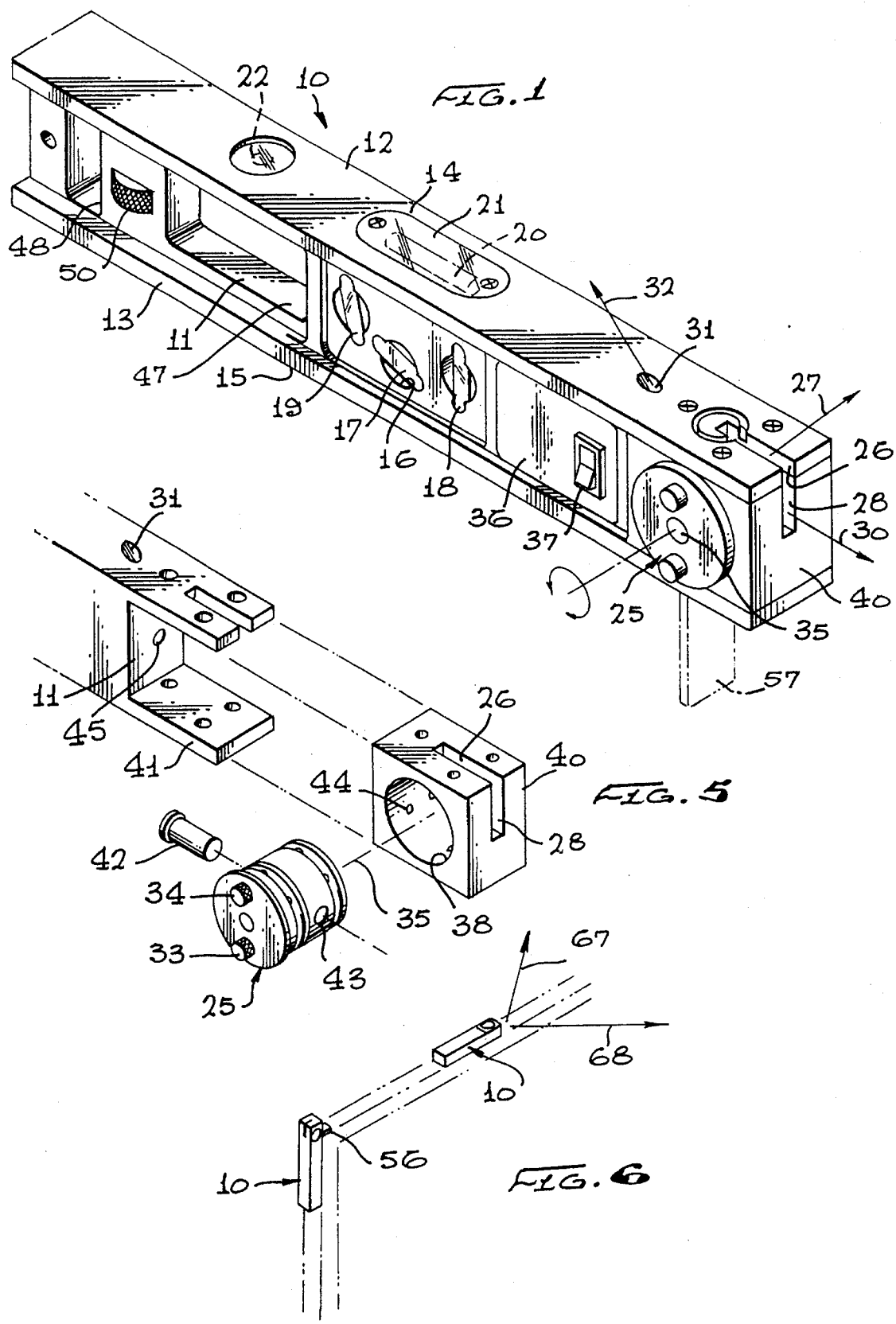

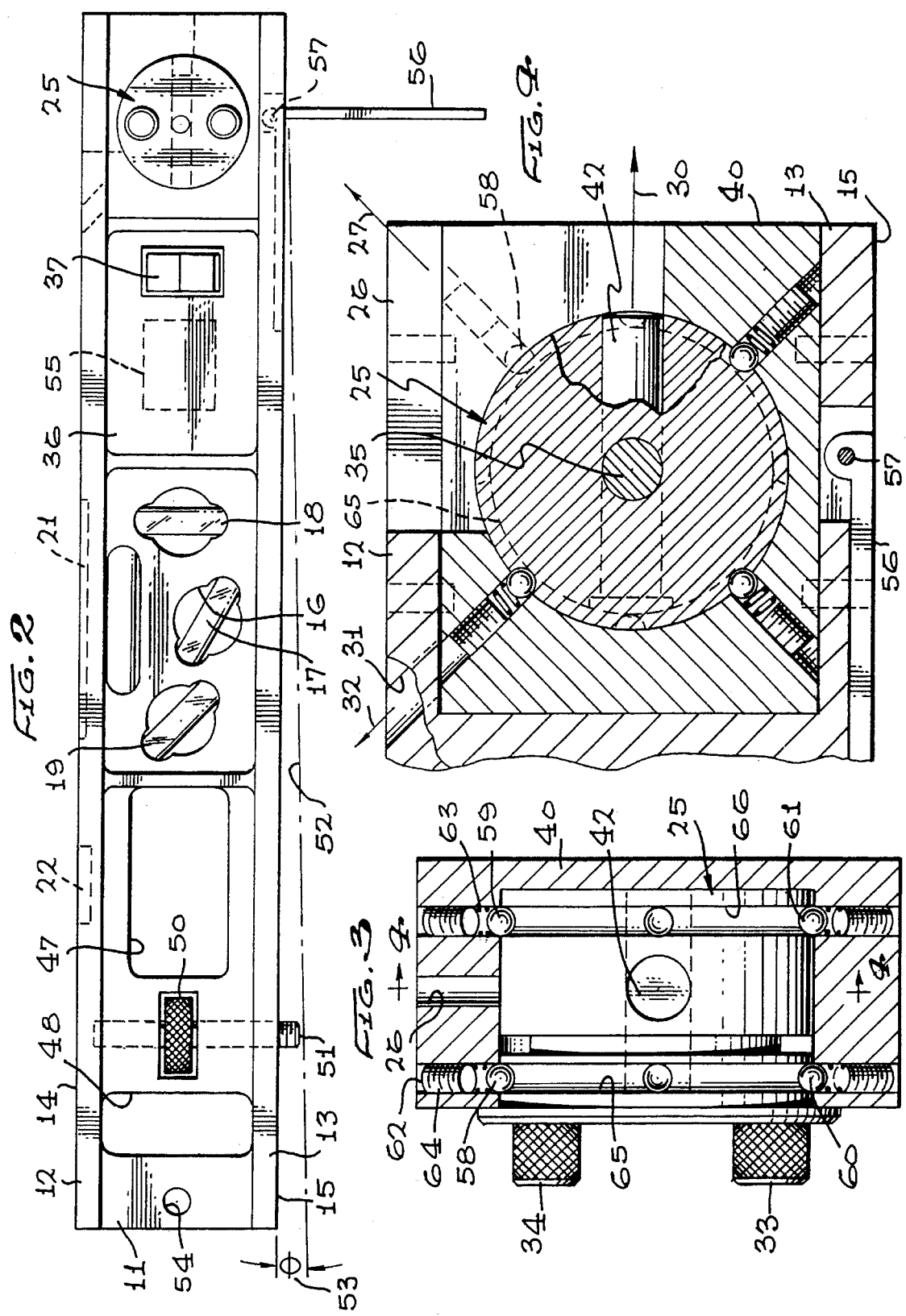

LEVELLING AND TRANSIT SYSTEM

BACKGROUND OF THE INVENTION

1. Field of the Invention

The present invention relates to the field of levelling and transit devices, and more particularly to a novel levelling and transit device having a rotatable laser beam generator capable of directing a linear beam in a plurality of directions and which further includes visual bubble indicators as well as device levelling means and a corner square means.

2. Brief Description of the Prior Art

In the past, it has been the conventional practice to use a levelling device which employs visual bubble indicators that detect and indicate the flatness of a surface. Also, it has been the conventional practice to employ laser devices which emit a linear beam so that flatness or level can be determined. Difficulties and problems have been encountered with such prior devices which stem largely from the fact that the bubble indicators are not always accurate and the laser beam is emitted in a direction established by the position of the level on a flat surface. In other words, the laser beam generator is not movable with respect to its support or mount on the flat surface and therefore, there is no versatility in the direction of the laser beam.

Other problems have also been encountered whereby several persons are employed to take measurements or establish flatness and a multiplicity of instruments are normally required. Furthermore, prior levels do not provide for a balance of components and may not be used in an inverted position and cannot be rotated.

Therefore, a long-standing need has existed to combine the features of a transit and the use of a level in a single device which will provide for many time-saving applications.

SUMMARY OF THE INVENTION

Accordingly, the above problems and difficulties are avoided by the present invention which provides a novel levelling and alignment device which includes an elongated member having top and bottom flat surfaces which are parallel and are separated by a thickened web. One end of the device includes a rotatable laser generator which produces a linear radar beam. The end of the member includes a plurality of open passageways or slots which are selectively alignable with the laser beam so that the member may be positioned on a flat support while the laser beam is rotated for a desired angular relationship with respect to the supporting surface. The web further includes a housing for enclosing electronic circuitry including a battery supply and connection means for operating the laser beam producing device. Ancillary components, such as a plurality of bubble indicators, are carried on the web in open cutouts for visual inspection and a thumb screw adjustment device is provided for adjusting the flat surfaces with respect to the supporting surface at the desire of the user. A pivotal panel is employed which is coextensive with a selected one of the flat surfaces in a storage position and is normal or perpendicular to the flat surface when it is in an operative position to constitute a square corner. An opening is provided in the web for receiving a string attachment so that the device may be used for plumb purposes.

Therefore, it is among the primary objects of the present invention to provide a level and transit system using a device having combined components which allows levelling and alignment procedures as well as transit functions in a single unitary device operable by one man.

Another object of the present invention resides in providing a levelling and alignment device which is versatile and which is efficient.

Yet another object of the present invention is to provide a levelling device which combines features of transit and use of a level in time-saving applications.

Another object of the, present invention is to provide a laser levelling device useful to identify existing conditions of a structure and which permits the generated laser beam to be directed in many directions.

Still another object of the present invention is to provide a levelling device having a unique balance of components and which employs a string slot so that the device may be used for plumb purposes as well as used in an inverted position and wherein a laser beam may be rotated to a desired angle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel levelling and transit device incorporating the present invention;

FIG. 2 is a side elevational view of the level and transit device shown in FIG. 1;

FIG. 3 is a transverse cross-sectional view of the device shown in FIG. 1;

FIG. 4 is an enlarged fragmentary sectional view taken in the direction of arrows 4—4 of FIG. 3;

FIG. 5 is an exploded fragmentary view of the device shown in FIG. 1; and

FIG. 6 is an environment perspective view showing typical uses of the level and transit device shown in FIG. 1.

DESCRIPTION OF THE PREFERRED EMBODIMENT

Referring to FIG. 1, the novel levelling and transit system of the present invention employs the novel levelling device indicated in the general direction of arrow 10, which comprises an elongated member having a thickened central web 11 separating a top rail 12 and a lower or bottom rail 13. The respective rails include elongated flat surfaces 14 and 15 respectively so that the member may be supported on a surface during levelling or transit functions and procedures. In a balance construction, the web 11 includes a plurality of cutouts, such as cutout 16, for exposing bubble indicators, such as bubble indicator 17 associated with cutout 16. It can be seen that the orientation of the bubble indicators are different so that respective angles and planes can be indicated. For example, the bubble indicator 17 may be used for horizontal readings like the bubble indicator 18 may be used for vertical readings. Additionally, the bubble indicator 19 may be employed for angular displacements. Another orientation for bubble indicators resides in recessing an indicator 20 through the flat top surface 14 so that when the undersurface 15 is supported on a flat surface, the indicator 20 may be used for levelling purposes. The indicator 20 is covered by a transparent plastic shield 21. Additionally, a button or circular bubble indicator is placed on the rail 12 and exposed through the flat surface 14. The circular bubble indicator is identified by numeral 22.

A feature of the invention resides in providing a rotatable module 25 which includes a laser beam generator whereby the module may be rotated with respect to the web 11 at one end thereof so as to point the laser beam through an open slot 26, as shown by arrow 27, or through an open slot 28 which communicates with slot 26, as indicated by arrow 30. Also, the laser beam may be aligned with an angular passageway 31 so that the laser beam, indicated by numeral 32, will be emitted at an angle with respect to the flat surface 14. The laser module 25 can be rotated by grasping either one of a pair of knobs 33 and 34 so that the module will rotate about its center 35.

The web 11 includes a housing 36 enclosing electrical circuitry for operating the laser beam generator within the module 25. The electrical circuit includes a power source, Such as a battery, control circuitry and an on/off switch 37. As shown more clearly in FIG. 5, the laser module 25 is carried in a bore 38 within a mounting block 40 that is fixedly secured to one end of the web 11 via a mounting receptacle broadly identified by numeral 41. A plurality of screws hold the mounting block 40 in position on the selected end of the device. The laser beam generator is indicated by numeral 42 and is of a conventional design. The generator emits a linear laser beam when activated by the button control 37. The laser beam generator is mounted on the rotatable module 25 by inserting the length of the generator into an open-ended bore 43. When the module 25 is rotated, the laser beam can be directed to emit through slot 26, slot 28 or through passageway 31 when openings 44 and 45 are in alignment with the passageway 31.

Referring now in detail to FIG. 2, it can be seen that the levelling device 10 includes lightning openings as identified by numerals 47 and 48 respectively. It can also be seen that the web 11 mounts an adjustable thumb actuated level wherein rotation of a knurled disc 50 causes screw 51 to protrude a given distance away from surface 15. Therefore, the level can be further adjusted to a supporting surface, indicated by numeral 52, by means of extending the screw 51 farther away from flat surface 15 or closer to the flat surface 15. The angle between the supporting surface 52 and the flat surface 15 is represented by the notation indicated by numeral 53. It can also be seen that the web 11 includes an open-ended aperture 54 through which a cord can be passed in order to support the member 10 in a downwardly depending position for achieving plumb line purposes. The various orientations of the bubble indicators 17, 18, 19 and 20 are indicated in their respective cutouts. Each indicator carries an amount of liquid, such as oil or the like, and an air bubble is included by which visual indication can be gained of level or degree of level. The electronic circuit for operating the laser beam generator 42 is indicated by numeral 55 within the housing 36. FIG. 2 also illustrates a panel 56 pivotally connected to one end of the member by means of pivot 57. When the panel is in its solid line position, the panel is used in cooperation with the surface 15 for serving as a square or corner. When the panel 56 is in its dotted line position, it is coextensive with the flat surface 15 and does not project beyond the surface.

Referring now in detail to FIGS. 3 and 4, it can be seen that the laser module 25 is maintained within its mounting block by means of spring-biased ball detents, such as balls 58, 59, 60 and 61. The balls are introduced through passageways, such as passageway 62 with respect to ball 58, followed by insertion of a spring 63 which is then followed by a set screw 64. The balls 58–61 inclusive operate as detents in combination with annular grooves 65 and 66 formed in the exterior of module 25 in spaced parallel relationship. Therefore, the laser module 25 may be not only rotated within its mounting block but may be readily snaplocked into and out of mounting engagement therewith.

In FIG. 4, it can be seen that the laser 42 emits a linear laser beam in the direction of arrow 30, arrow 27 or arrow 32 depending on the alignment of thee discharge and of the laser 42 with respect to the slots 26, 28 and passageway 31.

Referring now in detail to FIG. 6, it can be seen that the level device of the present invention may be used as a flat level with the laser beam emitted in the direction of arrow 67 or arrow 68. In an alternate usage, the level 10 may be used at a corner of the two structures when the panel 56 has been deployed to its operative position as shown. In either of these instances, the laser beam may be used for alignment purposes or the bubble indicators may be employed. It can be seen that the components of the single device are in a balanced relationship in order to be versatile for a variety of level or transit functions and that all of the indicators and laser beam emission components are carried on a single device readily operable by one person.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A level comprising:

an elongated member having a flat top surface and a bottom surface separated by a thickened web;

a selected end of said member having a slotted opening exposed at said end and at said top surface so as to define an opening having 90 degrees of exposure to ambient environment;

a circular module rotatably disposed on said member selected end; and a laser beam generator secured to said module and being in alignment with said slotted opening for transmission of a laser beam from said member via said slotted opening.

2. The invention as defined in claim 1 including:

an open-ended passageway in said selected end of said member spaced from said slotted opening and angularly disposed with respect to said top surface and extending from said module to said top surface.

3. The invention as defined in claim 2 including:

detent means releasably retaining said module to said member and permitting rotation of said module with respect to said member.

4. The invention as defined in claim 3 including:

a control and power circuit mounted in said web and operably coupled to said laser beam generator.

5. The invention as defined in claim 4 including:

a finger-grasping knob on said module for manually rotating said module for manually rotating said module in said member.

6. The invention as defined in claim 5 including:

a panel pivotally carried on said member adjacent said bottom surface and having a storage position flush with and coextensive with said flat bottom surface; and an operative position disposed normal to said flat bottom surface.

7. The invention as defined in claim 6 including:

a plurality of bubble level indicators mounted on said web between said top and said bottom surfaces; and said bubble level, indicators being elongated and having central longitudinal axis at different angles with respect to each other.

8. The invention as defined in claim 7 including:

a rotary projection carried on said member and having a support end extending beyond said flat bottom surface for adjustably extending said support end to a selected distance from said flat bottom surface.

9. A level and transit device comprising:

an elongated member having flat top and bottom surfaces separated by a thickened web maintaining said surfaces in fixed spaced-apart parallel relationship;

said web having a plurality of cutouts;

bubble indicators secured in each of said respective cutouts visually exposed from opposite sides of said web and through said flat top surface;

a selected end of said member web having a laser module rotatably mounted thereon;

said selected end of said member having open-ended passageways opening at said selected end and said top surface;

said laser module being movable for conducting the laser beam to a selected one of said member passageways in response to rotation of said laser module;

said web includes a housing adjacent to said laser module enclosing a circuit network;

a laser beam generator carried on said laser module for producing a linear laser beam;

circuit means connecting said circuit network with said laser beam generator;

a panel pivotally carried on said member having a storage position and an operative position;

said panel coextensive with said top flat surface when in said storage position;

said panel extending normal to said top flat surface when in said operative position to constitute a square in cooperation with said top flat surface;

said open-ended passageways include a pair of overlapping slots provided in said selected end of said member opening at said selected end and opening at said top surface whereby said laser beam radiates within a 90 degree passageway formed by said overlapping slots; and said open-ended passageways further include a bore provided in said selected end of said member communicating said laser module with said top surface and said bore being angularly disposed with respect to said top flat surface.

10. The invention as defined in claim 9 including:

adjustment means carried on said member having movable thumb screw projecting from said bottom flat surface for adjusting angular height of said member with respect to supporting structure.

11. The invention as defined in claim 10 including:

detent means cooperating between said laser module and said member retaining said laser module in a selected location for conducting the laser beam to said overlapping slots and to said angular bore.

\* \* \* \* \*